US012685292B2

(12) United States Patent
Qiu

(10) Patent No.: US 12,685,292 B2
(45) Date of Patent: Jul. 21, 2026

(54) CARRIER FRAMEWORK

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 0 days.

(21) Appl. No.: 19/026,557

(22) Filed: Jan. 17, 2025

(65) Prior Publication Data

US 2026/0068843 A1　　Mar. 12, 2026

(30) Foreign Application Priority Data

Sep. 11, 2024　(CN) .......................... 202422226383.6

(51) Int. Cl.
*A01K 1/02* (2006.01)

(52) U.S. Cl.
CPC .................................. *A01K 1/0236* (2013.01)

(58) Field of Classification Search
CPC .......... A01K 1/02; A01K 1/0236; A01K 1/03; B65D 5/36; B65D 1/225
See application file for complete search history.

(56) References Cited

U.S. PATENT DOCUMENTS

| | | | | |
|---|---|---|---|---|
| 4,684,034 A | * | 8/1987 | Ono .......................... | B65D 6/18 |
| | | | | 220/6 |
| D1,074,074 S | * | 5/2025 | Yun | |
| 2016/0014994 A1 | * | 1/2016 | Ma ........................... | A01K 1/03 |
| 2025/0127140 A1 | * | 4/2025 | Guo .......................... | A01K 1/03 |

FOREIGN PATENT DOCUMENTS

WO　　WO 2007095832 A1 *　8/2007　............... A01K 1/02

* cited by examiner

*Primary Examiner* — Joshua J Michener
*Assistant Examiner* — Henry Hooper Mudd
(74) *Attorney, Agent, or Firm* — Cooper Legal Group, LLC

(57) ABSTRACT

A carrier framework relates to the field of carriers. The carrier framework includes: two support frames arranged opposite to each other; a first connecting assembly including two ends connected to first ends of the two support frames respectively; and a second connecting assembly including two ends connected to second ends of the two support frames respectively. Since the first connecting assembly is detachably connected to the two support frames, and the second connecting assembly is rotatably connected to the two support frames, when the carrier framework is required to be folded and stored, the first connecting assembly can be slid rightwards to separate upper ends of the two support frames, and then, the second connecting assembly is folded to fold the two support frames for storage, further reducing a storage space of the carrier framework.

7 Claims, 8 Drawing Sheets

A

B

CARRIER FRAMEWORK

CROSS REFERENCE TO THE RELATED APPLICATIONS

This application is based upon and claims priority to Chinese Patent Application No. 202422226383.6, filed on Sep. 11, 2024, the entire contents of which are incorporated herein by reference.

TECHNICAL FIELD

The present disclosure relates to the field of carriers, and in particular, to a carrier framework.

BACKGROUND

With the improvement of living standards, more and more families raise cats, dogs, and other pets, and pet owners are willing to spend more time in interacting with their pets. When traveling outside with pets, pet owners use pet carriers to carry their pets for the convenience of the traveling.

Conventional pet carrier frameworks have large sizes and cannot be folded, such that large spaces are required during carrying.

SUMMARY

In order to solve the technical problem that conventional pet carrier frameworks have large sizes and cannot be folded, such that large spaces are required during carrying, an objective of the present disclosure is to provide a carrier framework.

In order to achieve the above objective, an embodiment of the present disclosure provides a carrier framework, including: two support frames, where the two support frames are arranged opposite to each other; a first connecting assembly, where the first connecting assembly includes two ends connected to first ends of the two support frames respectively; and a second connecting assembly, where the second connecting assembly includes two ends connected to second ends of the two support frames respectively.

Since the first connecting assembly is detachably connected to the two support frames, and the second connecting assembly is rotatably connected to the two support frames, when the carrier framework is required to be folded and stored, the first connecting assembly can be slid rightwards to separate upper ends of the two support frames, and then, the second connecting assembly is folded to fold the two support frames for storage, further reducing a storage space of the carrier framework.

In addition, the carrier framework according to the above embodiment of the present disclosure can also have the following additional technical features.

In the above technical solution, each of the two support frames includes: a first U-shaped rod, where the first U-shaped rod includes a first open end and a first closed end; a second U-shaped rod, where the second U-shaped rod includes a second open end and a second closed end, and the second open end is rotatably connected to the first closed end; and connecting rods, where each of the connecting rods has an end rotatably connected to the second closed end.

Since the second open end is rotatably connected to the first closed end, and an end of each of the connecting rods is rotatably connected to the second closed end, it is convenient for an operator to rotate the connecting rods, the first U-shaped rod, and the second U-shaped rod to reduce the operating difficulty.

In the above technical solution, the first connecting assembly includes: first connecting members, where each of the first connecting members is slidably connected to adjacent ends of two oppositely arranged ones of the connecting rods of the two support frames, and a connecting groove and a protrusion are respectively arranged at the adjacent ends of the two oppositely arranged ones of the connecting rods of the two support frames; cavities, where the cavities are respectively formed in the connecting rods of the two support frames; springs, where each of the springs is arranged in one of two oppositely arranged cavities of the cavities; slide rails, where two adjacent ones of the slide rails are respectively formed on two sides of a respective one of the connecting rods, and the two adjacent ones of the slide rails are in communication with a respective one of the cavities; and slide rods, where each of the slide rods is slidably connected in the two adjacent ones of the slide rails, each of the slide rods is fixedly connected to an end of a respective one of the springs away from the second U-shaped rod, and the slide rods respectively extend through the first connecting members.

Since each of the first connecting members is slidably connected to the adjacent ends of the two oppositely arranged ones of the connecting rods of the two support frames, and the two oppositely arranged ones of the connecting rods of the two support frames can be mounted or dismounted by sliding a respective one of the first connecting members, the operation process is simple and convenient. Engagement of the connecting groove and the protrusion ensures that the two oppositely arranged ones of the connecting rods of the two support frames can be preliminarily limited before the respective one of the first connecting members is slid, facilitating the subsequent sliding of the respective one of the first connecting members. The cooperation of the springs, the slide rails, and the slide rods can ensure that in use of the connecting rods, each of the first connecting members always sleeves at the adjacent ends of the two oppositely arranged ones of the connecting rods of the two support frames, so as to avoid an unstable connection of the whole device due to the slip of the first connecting members.

In the above technical solution, the second connecting assembly includes: grooves, where the grooves are formed at the first open end; first openings, where the first openings are formed on a side of the first U-shaped rod away from the second U-shaped rod, and the first openings are respectively connected to the grooves; through holes, where the through holes are respectively formed on two sides of the first open end, and the through holes are respectively in communication with the grooves; second connecting members, where each of the second connecting members has two ends extending into two oppositely arranged ones of the grooves respectively; and rivets, where the rivets respectively extend through the through holes, and two adjacent ones of the rivets extend through a respective one of the second connecting members, the rivets are rotatably connected to the through holes respectively, and the two adjacent ones of the rivets are fixedly connected to the respective one of the second connecting members.

Since the two ends of each of the second connecting members extend into the two oppositely arranged ones of the grooves respectively, and the first openings respectively connected to the grooves are formed on the side of the first U-shaped rod away from the second U-shaped rod, when the carrier framework is required to be folded, two first U-shaped rods can be rotated downwards, and then, the connecting rods, the first U-shaped rods, and the second U-shaped rods are folded in parallel, reducing the storage space of the carrier framework. The first openings respectively connected to the grooves are only formed on the side of the first U-shaped rod away from the second U-shaped rod, thereby ensuring that the first U-shaped rod is not obstructed during downward rotation.

In the above technical solution, each of the second connecting members includes a first connecting plate and two second connecting plates, the two second connecting plates are fixedly connected to two sides of the first connecting plate respectively, and the two second connecting plates extend into the two oppositely arranged ones of the grooves respectively.

Since two plate surfaces of the first connecting plate are aligned with the two first open ends respectively, after the carrier framework is folded, the two first open ends arranged opposite to each other are prevented from mutual friction, thereby reducing damage to the first U-shaped rod.

In the above technical solution, the first openings respectively connected to the grooves are formed on the side of the first U-shaped rod away from the second U-shaped rod, and limiting members are slidably connected to two ends of one of the first U-shaped rods of the two support frames, respectively.

Since the limiting members are slidably connected to the two ends of one of the first U-shaped rods of the two support frames, respectively, when the carrier framework is used, the limiting members sleeve at the two first open ends arranged opposite to each other, such that the first open ends and the second connecting members are kept horizontal, the limiting members can prevent the first U-shaped rods from rotating, and the carrier framework can be used normally.

In the above technical solution, a second opening is formed on each of the limiting members, an elastic member is fixedly connected in the second opening, and the elastic member is in interference fit with the one of the first U-shaped rods of the two support frames.

Since the elastic member is fixedly connected in the second opening, and the elastic member is in interference fit with the one of the first U-shaped rods of the two support frames, the limiting members can be prevented from loosening, further ensuring that the carrier framework does not rotate in use.

In the above technical solution, a length of each of the rivets is greater than an inner diameter of a respective one of the grooves.

Since the length of each of the rivets is greater than the inner diameter of the respective one of the grooves, the rivets can have a limiting effect on the second connecting members to prevent the second connecting members from falling off from the first U-shaped rod.

Additional aspects and advantages of the present disclosure will become apparent in the following description, or will be learned from the practice of the present disclosure.

BRIEF DESCRIPTION OF THE DRAWINGS

The above and/or additional aspects and advantages of the present disclosure will become apparent and readily appreciated from the descriptions of embodiments made with reference to the following drawings, in which.

Figure 1:
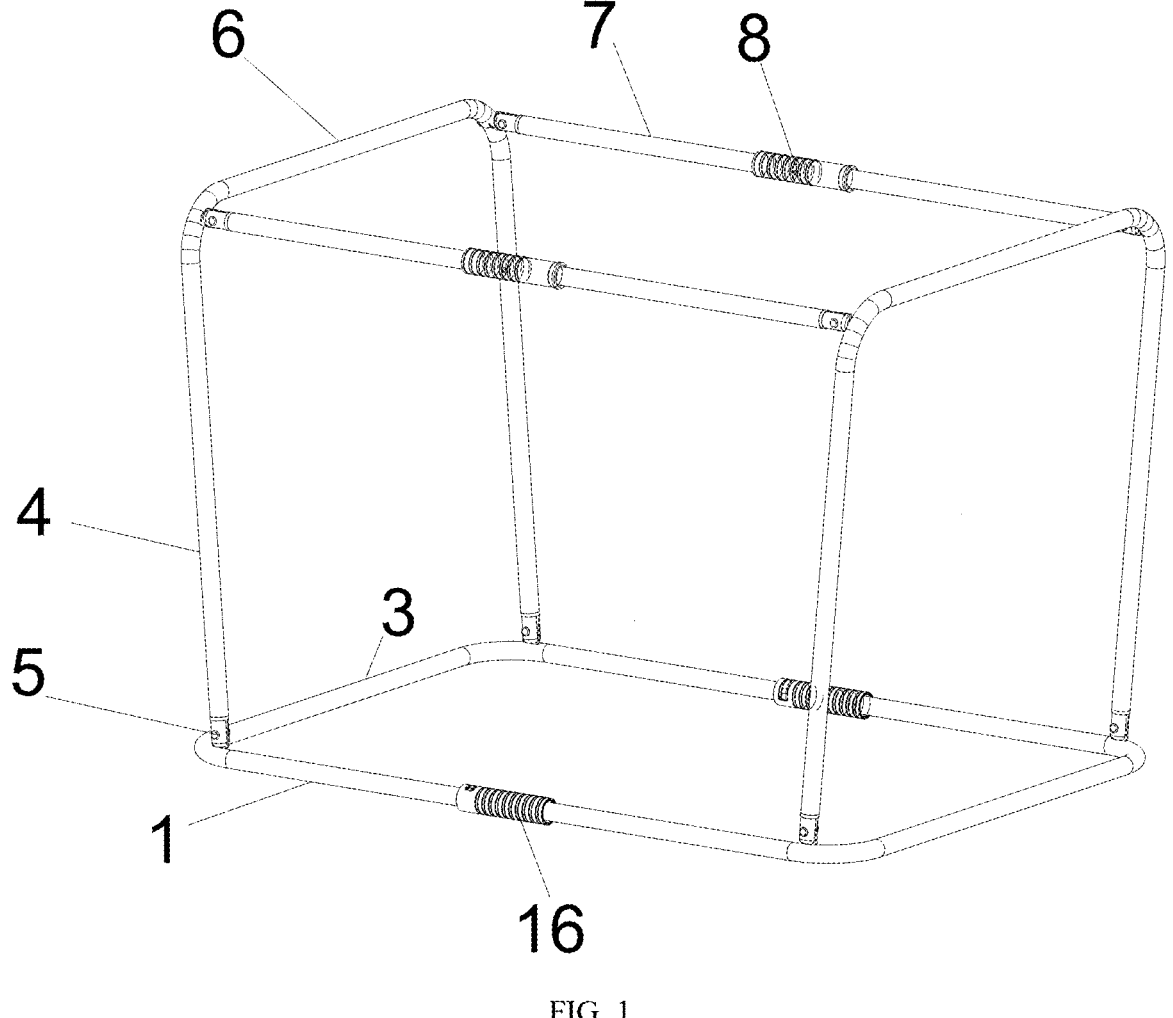
FIG. 1 is a schematic structural diagram of a carrier framework according to an embodiment of the present disclosure.

In the drawings, the reference numerals in FIGS. 1 to 8 are as follows:

1. first U-shaped rod; 2. first open end; 3. first closed end; 4. second U-shaped rod; 5. second open end; 6. second closed end; 7. connecting rod; 8. first connecting member; 9. groove; 10. first opening; 11. through hole; 12. second connecting member; 13. first connecting plate; 14. second connecting plate; 15. rivet; 16. limiting member; 17. second opening; 18. elastic member; 19. connecting groove; 20. protrusion; 21. cavity; 22. spring; 23. slide rail; 24. slide rod.

DETAILED DESCRIPTION OF THE EMBODIMENTS

In order to understand the above objectives, features, and advantages of the present disclosure more clearly, the present disclosure is further described in detail below in conjunction with the accompanying drawings and specific embodiments. It should be noted that the embodiments in the present application and features in the embodiments may be combined with each other without conflicts.

In the following description, numerous specific details are set forth to facilitate a full understanding of the present disclosure; however, the present disclosure may be implemented in other ways than those described herein, and therefore, the scope of protection of the present disclosure is not limited by the specific embodiments disclosed below.

A carrier framework according to some embodiments of the present disclosure is described below with reference to FIGS. 1 to 8.

As shown in FIGS. 1, 2, 3, and 7, an embodiment of the present disclosure provides a carrier framework, including two support frames, a first connecting assembly, and a second connecting assembly.

Specifically, the two support frames are arranged opposite to each other. Two ends of the first connecting assembly are connected to first ends of the two support frames respectively. Two ends of the second connecting assembly are connected to second ends of the two support frames respectively.

In use of the carrier framework according to the above embodiment of the present disclosure, each of the two support frames includes four free ends, the four free ends form a rectangle, and therefore, the two support frames are arranged opposite to each other, and the four free ends on one of the two support frames are respectively arranged opposite to the four free ends on the other of the two support frames. Two oppositely arranged ones of the upper free ends of the two support frames are connected together through the first connecting assembly, and two oppositely arranged ones of the lower free ends of the two support frames are connected together through the second connecting assembly. When the carrier framework is required to be folded, the first connecting assembly is slid rightwards to separate the first connecting assembly from the left free ends, so as to separate the two oppositely arranged ones of the upper free ends, and then, two respective ones of the lower free ends are downwards rotated to fold the two support frames together, thereby reducing the storage space.

Figure 2:
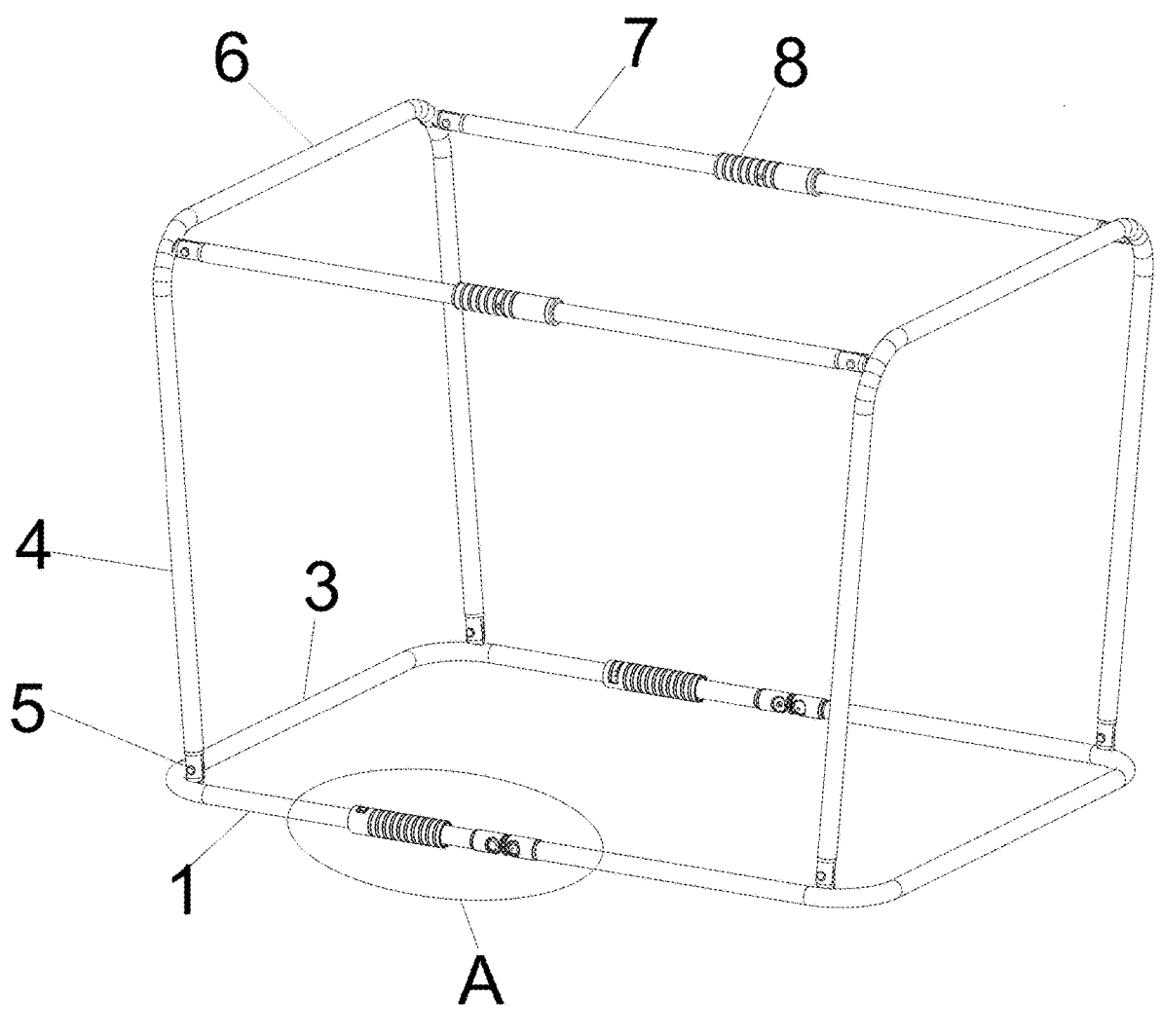
FIG. 2 is a schematic structural diagram of a carrier framework according to an embodiment of the present disclosure.
Figure 7:
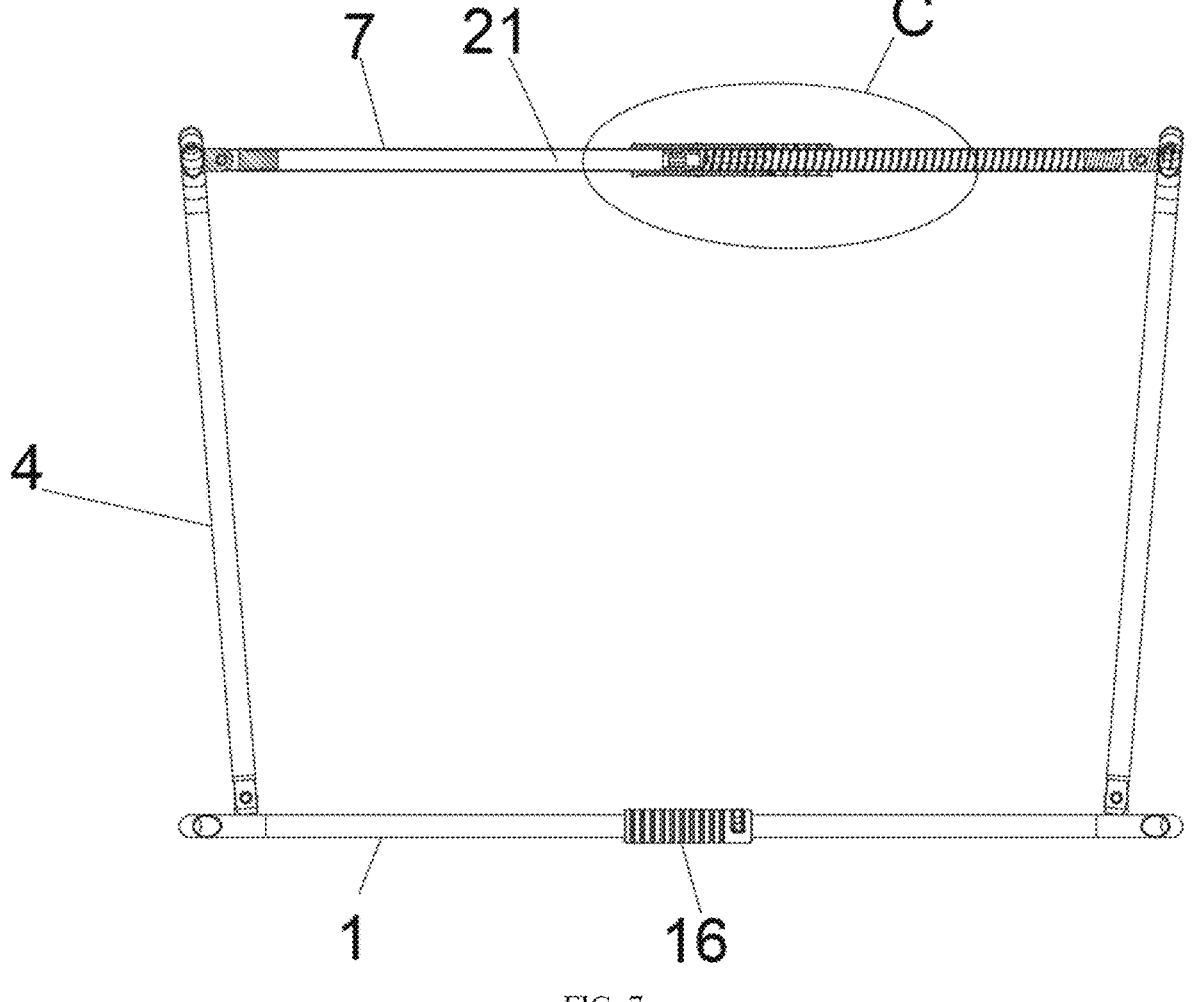
FIG. 7 is a front schematic structural diagram of a carrier framework according to an embodiment of the present disclosure.
Figure 8:
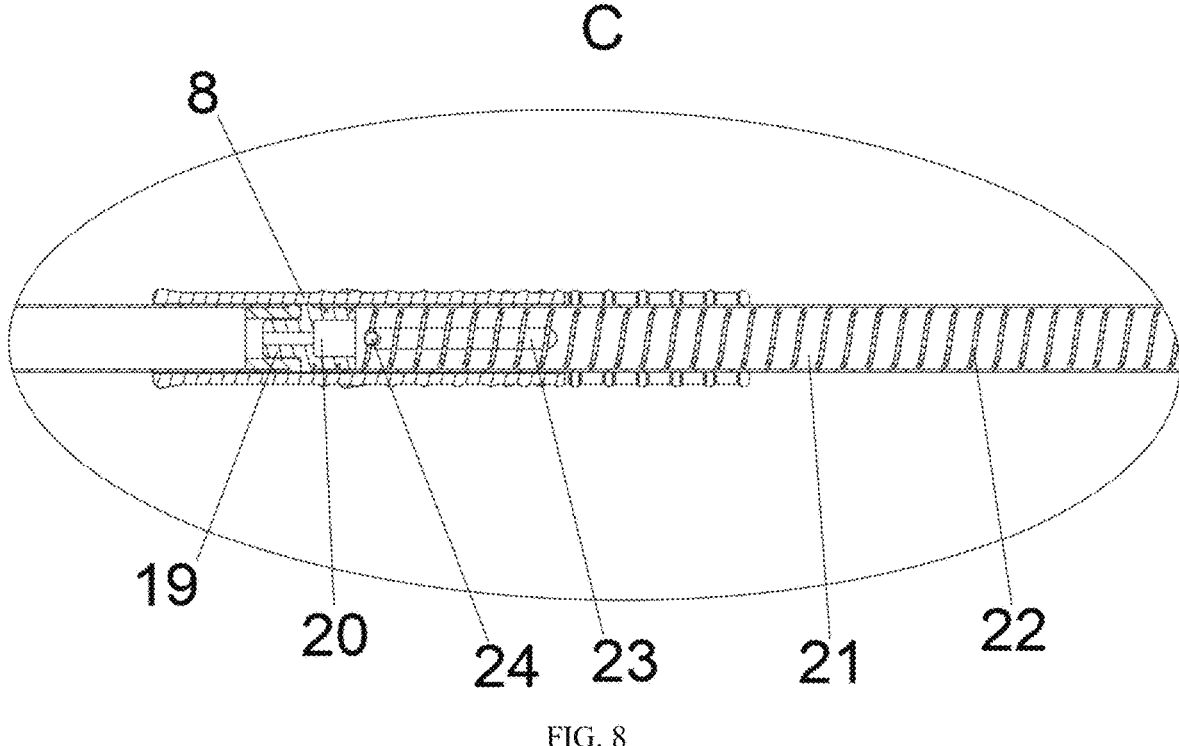
FIG. 8 is a schematic enlarged structural diagram of part C in an embodiment of the present disclosure.

As shown in FIGS. 1, 2, and 7, in an embodiment of the present disclosure, each of the two support frames includes: a first U-shaped rod 1, where the first U-shaped rod 1 includes a first open end 2 and a first closed end 3; a second U-shaped rod 4, where the second U-shaped rod 4 includes a second open end 5 and a second closed end 6, and the second open end 5 is rotatably connected to the first closed end 3; and connecting rods 7, where each of the connecting rods 7 has an end rotatably connected to the second closed end 6.

The two first U-shaped rods 1 of the two support frames are horizontally arranged opposite to each other, such that the two first open ends 2 of the two first U-shaped rods 1 are arranged opposite to each other. Each of the two first open ends 2 includes two free ends, two oppositely arranged ones of the free ends of the two first open ends 2 are connected through the second connecting assembly. The second U-shaped rod 4 is vertically arranged. The second open end 5 also includes two free ends, and the two free ends of the second open end 5 are rotatably connected to two ends of the first closed end 3 respectively. The connecting rods 7 are rotatably connected to two ends of the second closed end 6 respectively. Since two second U-shaped rods 4 are provided, the connecting rods 7 rotatably connected to one of the two second U-shaped rods 4 are arranged opposite to the connecting rods 7 rotatably connected to the other of the two second U-shaped rods 4 respectively, two oppositely arranged ones of the connecting rods 7 rotatably connected to the two second U-shaped rods 4 are connected through the first connecting assembly, the two free ends of the second open end 5 are rotatably connected to the two ends of the first closed end 3 respectively, and first ends of the two connecting rods 7 of each of the two support frames are rotatably connected to the two ends of the second closed end 6 respectively, the connecting rods 7, the first U-shaped rods 1, and the second U-shaped rods 4 can be conveniently rotated by an operator to reduce operating difficulty.

As shown in FIGS. 1, 2, 7, and 8, in an embodiment of the present disclosure, the first connecting assembly includes: first connecting members 8, where each of the first connecting members 8 is slidably connected to adjacent ends of two oppositely arranged ones of the connecting rods 7 of the two support frames, and a connecting groove 19 and a protrusion 20 are respectively arranged at the adjacent ends of the two oppositely arranged ones of the connecting rods 7 of the two support frames; cavities 21, where the cavities 21 are respectively formed in the connecting rods 7 of the two support frames; springs 22, where each of the springs 22 is arranged in one of two oppositely arranged cavities 21 of the cavities 21; slide rails 23, where two adjacent ones of the slide rails 23 are respectively formed on two sides of a respective one of the connecting rods 7, and the two adjacent ones of the slide rails 23 are in communication with a respective one of the cavities 21; and slide rods 24, where each of the slide rods 24 is slidably connected in the two adjacent ones of the slide rails 23, each of the slide rods 24 is fixedly connected to an end of a respective one of the springs 22 away from the second U-shaped rod 4, and the slide rods 24 respectively extend through the first connecting members 8.

It should be noted that in use of the carrier framework, each of the first connecting members 8 is slidably connected to the adjacent ends of the two oppositely arranged ones of the connecting rods 7 of the two support frames. The connecting groove 19 is formed at an end of the left connecting rod 7 away from the left second U-shaped rod 4, the protrusion 20 is fixedly connected to an end of the right connecting rod 7 away from the right second U-shaped rod 4, and the protrusion 20 extends into the connecting groove 19. The cavities 21 are respectively formed in the two oppositely arranged ones of the connecting rods 7 of the two support frames, the spring 22 is arranged in the cavity 21 of the right connecting rod 7, and the slide rails 23 are respectively formed on the two sides of the right connecting rod 7. The slide rails 23 are in communication with the right cavity 21. The slide rod 24 is slidably connected in the slide rails 23, the slide rod 24 is fixedly connected to an end of the spring 22 away from the right second U-shaped rod 4, and the slide rod 24 extends through the first connecting member 8.

When the two oppositely arranged ones of the connecting rods 7 of the two support frames are required to be disassembled, the first connecting member 8 is slid rightwards, the first connecting member 8 drives the slide rod 24 to slide rightwards along the slide rails 23, the slide rod 24 then drives the end of the spring 22 away from the right second U-shaped rod 4 to slide rightwards, the spring 22 contracts until the first connecting member 8 is completely separated from the left connecting rod 7, and the two oppositely arranged ones of the connecting rods 7 of the two support frames are not limited by the first connecting member 8, and the two oppositely arranged ones of the connecting rods 7 drop downwards.

When the two oppositely arranged ones of the connecting rods 7 of the two support frames are required to be assembled, the first connecting member 8 is firstly slid towards the right first U-shaped rod, two connecting rods 7 are then rotated upwards until the protrusion 20 can extend into the connecting groove 19, and subsequently, since an outer diameter of an end of the protrusion 20 adjacent to the left connecting rod is smaller than an inner diameter of the connecting groove 19, after the protrusion 20 extends into the connecting groove 19, the protrusion 20 can support the connecting groove 19. Then, when one of the two oppositely arranged ones of the connecting rods 7 of the two support frames is rotated upwards, the other of the two oppositely arranged ones of the connecting rods 7 of the two support frames can upwards rotate therewith until the two connecting rods 7 are horizontal. Subsequently, the first connecting member 8 is released, the first connecting member 8 can be driven to sleeve at the adjacent ends of the two oppositely arranged ones of the connecting rods 7 of the two support frames during the spring 22 restoring its deformation, such that the two oppositely arranged ones of the connecting rods 7 of the two support frames are assembled.

The assembly of the connecting rods 7 can be completed only by rotating the connecting rods 7 and sliding the first connecting members 8 in the above assembly process, which is simple and convenient.

Figure 4:
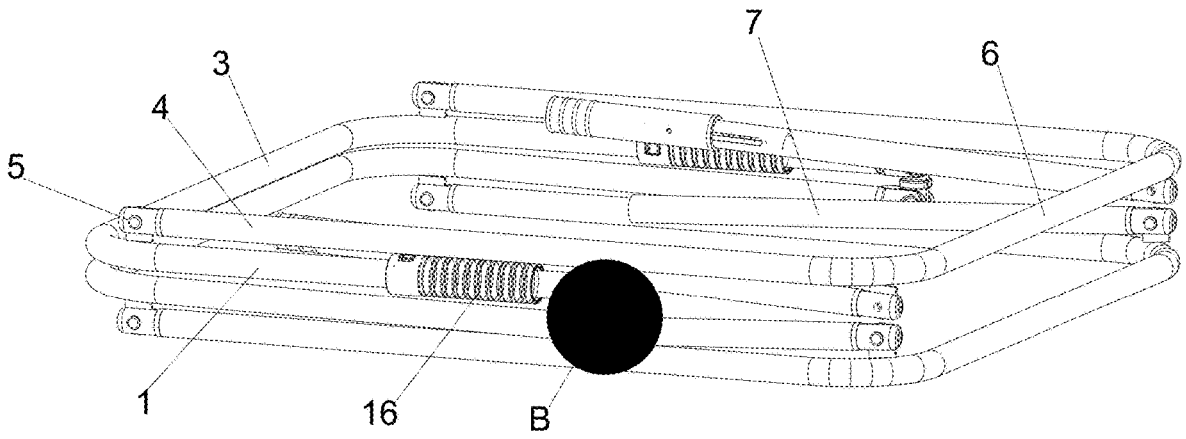
FIG. 4 is a schematic structural diagram of a carrier framework in a folded state according to an embodiment of the present disclosure.
Figure 5:
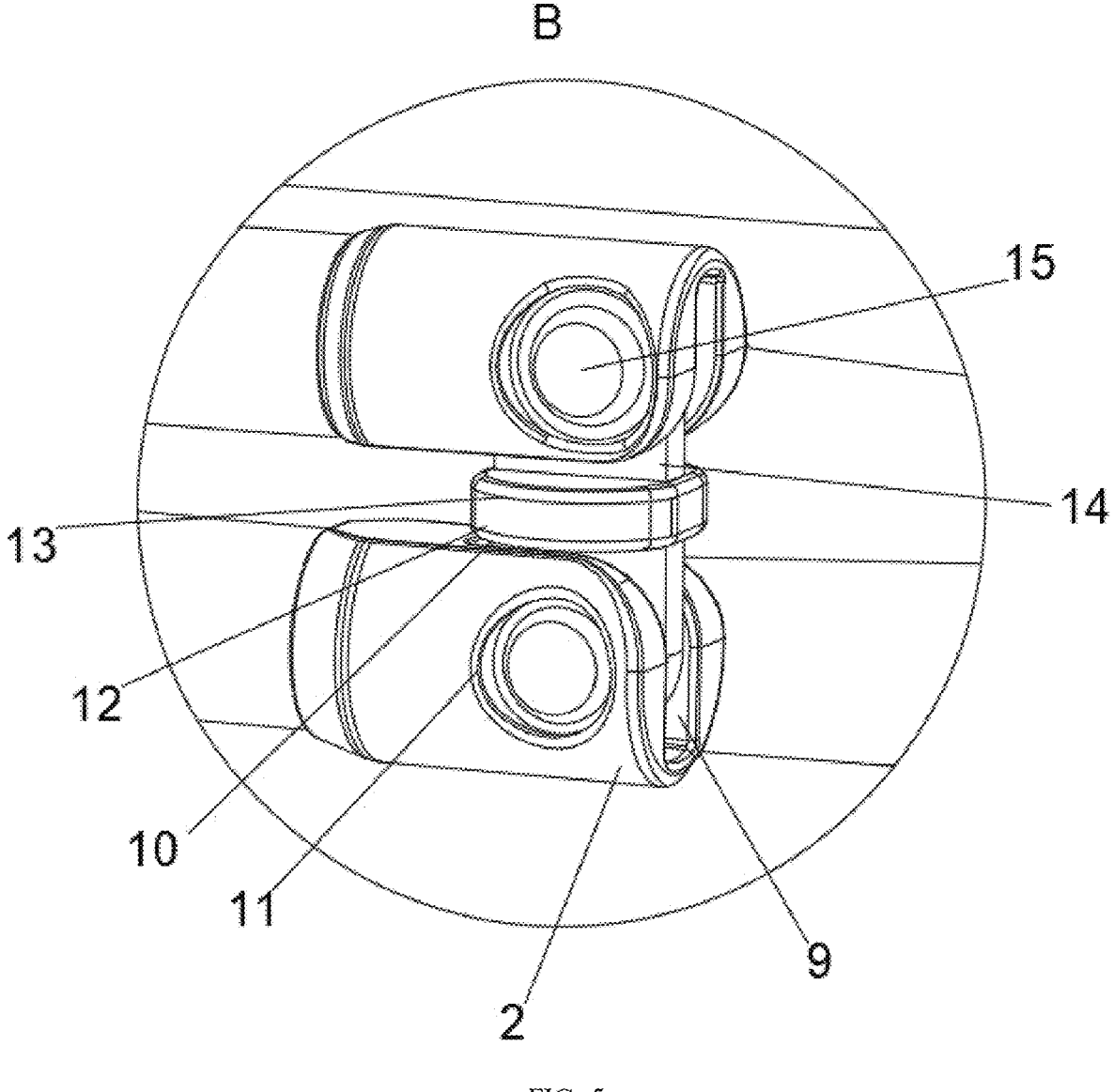
FIG. 5 is a schematic enlarged structural diagram of part B in an embodiment of the present disclosure.

As shown in FIGS. 1, 4, and 5, in an embodiment of the present disclosure, the second connecting assembly includes: grooves 9, where the grooves 9 are formed at the first open end 2; first openings 10, where the first openings 10 are formed on a side of the first U-shaped rod 1 away from the second U-shaped rod 4, and the first openings 10 are respectively connected to the grooves 9; through holes 11, where the through holes 11 are respectively formed on two sides of the first open end 2, and the through holes 11 are respectively in communication with the grooves 9; second connecting members 12, where each of the second connecting members 12 has two ends extending into two oppositely arranged ones of the grooves 9 respectively; and rivets 15, where the rivets 15 respectively extend through the through holes 11, and two adjacent ones of the rivets 15 extend through a respective one of the second connecting members 12, the rivets 15 are rotatably connected to the through holes 11 respectively, and the two adjacent ones of the rivets 15 are fixedly connected to the respective one of the second connecting members 12. A length of each of the rivets 15 is greater than an inner diameter of a respective one of the grooves 9.

When the carrier framework is folded, after the first connecting members 8 are detached, the two first closed ends are pulled downwards. Since the grooves 9 are formed at the first open end 2, two ends of each of the second connecting members 12 extend into two oppositely arranged ones of the grooves 9 respectively, and the first openings 10 respectively connected to the grooves 9 are formed on the side of the first U-shaped rod 1 away from the second U-shaped rod 4, two first U-shaped rods 1 can be rotated downwards without being obstructed by the second connecting members 12 until the two first U-shaped rods 1 are folded together. The through holes 11 are respectively formed on the front side and the rear side of the first open end 2, the through holes 11 are respectively connected to the grooves 9, the rivets 15 respectively extend through the through holes 11, and two adjacent ones of the rivets 15 extend through a respective one of the second connecting members 12, and the two adjacent ones of the rivets 15 are fixedly connected in the respective one of the second connecting members 12, two ends of each of the two adjacent ones of the rivets 15 extend out of the respective one of the second connecting members 12, and the length of each of the rivets 15 is greater than the inner diameter of a respective one of the grooves 9, such that the rivets 15 can have a limiting effect on the second connecting members 12 to prevent two ends of each of the second connecting members 12 from sliding out of the grooves 9.

As shown in FIG. 5, in an embodiment of the present disclosure, each of the second connecting members 12 includes a first connecting plate 13 and two second connecting plates 14, the two second connecting plates 14 are fixedly connected to two sides of the first connecting plate 13 respectively, and the two second connecting plates 14 extend into the two oppositely arranged ones of the grooves 9 respectively.

Since two plate surfaces of the first connecting plate 13 are aligned with the two first open ends 2 respectively, after the carrier framework is folded, the two first open ends 2 arranged opposite to each other are prevented from mutual friction, thereby reducing damage to the first U-shaped rod 1. The two second connecting plates 14 are fixedly connected to the two sides of the first connecting plate 13 respectively, the two second connecting plates 14 extend into the two oppositely arranged ones of the grooves 9 respectively, and a plate surface of each of the second connecting plates 14 is perpendicular to a respective one of the rivets 15 to facilitate the rivet 15 to pass through the second connecting plate 14.

Figure 3:
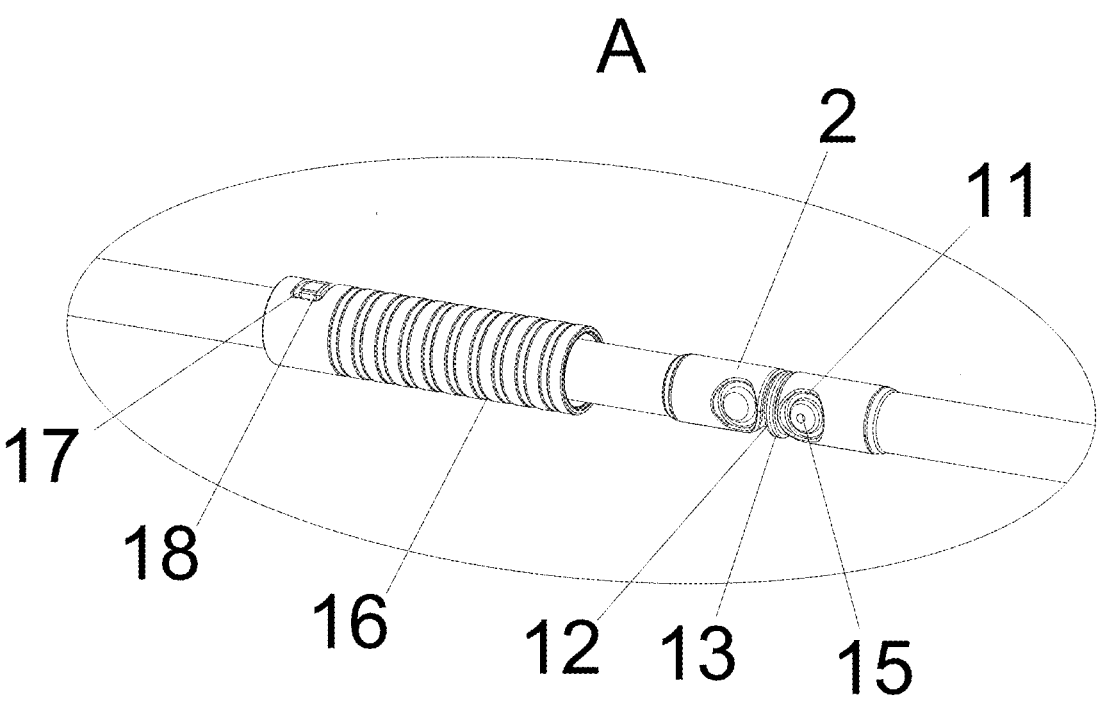
FIG. 3 is a schematic enlarged structural diagram of part A in an embodiment of the present disclosure.

As shown in FIGS. 2 and 3, in an embodiment of the present disclosure, the first openings 10 respectively connected to the grooves 9 are formed on the side of the first U-shaped rod 1 away from the second U-shaped rod 4, and limiting members 16 are slidably connected to two ends of one of the first U-shaped rods of the two support frames, respectively.

Since the limiting members 16 are slidably connected to two ends of the left first U-shaped rod 1 respectively, and the limiting members 16 are each made of a hard material, such as a metal material and a plastic material, when the carrier framework is pressed, the limiting members 16 can achieve a good support effect to be prevented from being damaged. When the carrier framework is used, the limiting members 16 sleeve at the two first open ends 2 arranged opposite to each other to keep the two first U-shaped rods 1 horizontal, the first U-shaped rods 1 are limited by the limiting members 16 to prevent the first U-shaped rods 1 from rotating, and the carrier framework can be used normally. When the carrier framework is required to be folded, the limiting members 16 are slid leftwards to separate the limiting members 16 from the outsides of the two first open ends 2 arranged opposite to each other, and the first U-shaped rods 1 are not limited by the limiting members 16 and can normally rotate downwards.

Figure 6:
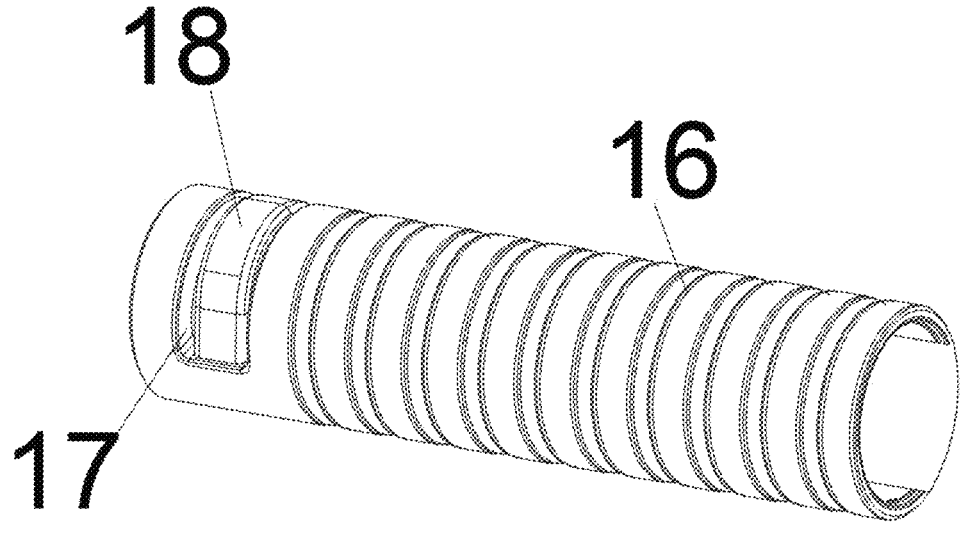
FIG. 6 is a schematic structural diagram of a limiting member in an embodiment of the present disclosure.

As shown in FIGS. 2, 3, and 6, in an embodiment of the present disclosure, a second opening 17 is formed on each of the limiting members 16, an elastic member 18 is fixedly connected in the second opening 17, and the elastic member 18 is in interference fit with the one of the first U-shaped rods 1 of the two support frames.

Since the second opening 17 is formed at a left end of a side wall of each of the limiting members 16, the elastic member 18 is fixedly connected in the second opening 17, the elastic member 18 may be made of rubber, and the elastic member 18 is in interference fit with the one of the first U-shaped rods 1 of the two support frames, the limiting members 16 can be prevented from loosening, further ensuring that the carrier framework does not rotate in use.

It should be noted that when the elastic member 18 is located at a left end of each of the limiting members 16, the limiting members 16 are slidably connected to the left first U-shaped rod 1, and when the elastic member 18 is located at a right end of each of the limiting members 16, the limiting members 16 are slidably connected to the right first U-shaped rod 1, which can reduce a sliding distance and sliding difficulty of the limiting members 16.

The present disclosure has the following advantages.

1. The first connecting assembly is slidably connected to a joint of upper ends of the left support frame and the right support frame, the upper ends of the two support frames can be separated from each other only by sliding the first connecting assembly rightwards, and the operations are easy and convenient.

2. The two support frames can be folded together through the second connecting assembly, reducing the storage space. After the upper ends of the two support frames are separated, the two support frames can be folded together only by pulling the two support frames downwards, and the operation process is easy and convenient.

In the present disclosure, the terms "mounted", "connected", "coupled", "fixed", or the like, are used in a broad sense, and for example, "coupled" may be fixed coupling, detachable coupling, or integral coupling; "connected" may be a direct connection or an indirect connection via an intermediate. The above terms can be understood by those skilled in the art according to specific situations.

In descriptions of the present disclosure, it should be understood that, directions or positional relationships indicated by terms "inner", "outer" etc. are based on orientations or positional relationships shown in the accompanying drawings, and they are used only for describing the present disclosure and for description simplicity, but do not indicate or imply that an indicated device or unit must have a specific direction or be constructed and operated in a specific orientation. Therefore, it cannot be understood as a limitation on the present disclosure.

In the description of the specification, descriptions of terms "an embodiment", "some embodiments", "a specific embodiment", or the like, mean that a particular feature, structure, material, or characteristic described in connection with the embodiment or example is included in at least one embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples.

The above description is only preferred embodiments of the present disclosure and is not intended to limit the present disclosure, and various modifications and changes may be made to the present disclosure by those skilled in the art. Any modification, equivalent replacement, or improvement made within the spirit and principle of the present disclosure shall be included in the protection scope of the present disclosure.

What is claimed is:

1. A carrier framework, comprising:
two support frames, wherein:
    the two support frames are arranged opposite to each other, and
    each of the two support frames comprises:
        a first U-shaped rod, wherein the first U-shaped rod comprises a first open end and a first closed end;
        a second U-shaped rod, wherein the second U-shaped rod comprises a second open end and a second closed end, and the second open end is rotatably connected to the first closed end; and
        connecting rods, wherein each of the connecting rods has an end rotatably connected to the second closed end;
a first connecting assembly, wherein:
    two ends of the first connecting assembly are connected to first ends of the two support frames respectively, and
    the first connecting assembly comprises:
        first connecting members, wherein each of the first connecting members is slidably connected to adjacent ends of two oppositely arranged ones of the connecting rods of the two support frames, and a connecting groove and a protrusion are respectively arranged at the adjacent ends of the two oppositely arranged ones of the connecting rods of the two support frames;
        cavities, wherein the cavities are respectively formed in the connecting rods of the two support frames;
        springs, wherein each of the springs is arranged in one of two oppositely arranged cavities of the cavities;
        slide rails, wherein two adjacent ones of the slide rails are respectively formed on two sides of a respective one of the connecting rods, and the two adjacent ones of the slide rails are in communication with a respective one of the cavities; and slide rods, wherein each of the slide rods is slidably connected in the two adjacent ones of the slide rails, each of the slide rods is fixedly connected to an end of a respective one of the springs away from the second U-shaped rod, and the slide rods respectively extend through the first connecting members; and
a second connecting assembly, wherein two ends of the second connecting assembly are connected to second ends of the two support frames respectively.

2. The carrier framework according to claim 1, wherein the second connecting assembly comprises:
    grooves, wherein the grooves are formed at the first open end;
    first openings, wherein the first openings are formed on a side of the first U-shaped rod away from the second U-shaped rod, and the first openings are respectively connected to the grooves;
    through holes, wherein the through holes are respectively formed on two sides of the first open end, and the through holes are respectively in communication with the grooves;
    second connecting members, wherein each of the second connecting members has two ends extending into two oppositely arranged ones of the grooves respectively; and
    rivets, wherein the rivets respectively extend through the through holes, two adjacent ones of the rivets extend through a respective one of the second connecting members, the rivets are rotatably connected to the through holes respectively, and the two adjacent ones of the rivets are fixedly connected to the respective one of the second connecting members.

3. The carrier framework according to claim 2, wherein each of the second connecting members comprises a first connecting plate and two second connecting plates, the two second connecting plates are fixedly connected to two sides of the first connecting plate respectively, and the two second connecting plates extend into the two oppositely arranged ones of the grooves respectively.

4. The carrier framework according to claim 1, wherein limiting members are slidably connected to two ends of one of the first U-shaped rods of the two support frames, respectively.

5. The carrier framework according to claim 4, wherein a second opening is formed on each of the limiting members, an elastic member is fixedly connected in the second opening, and the elastic member is in interference fit with the one of the first U-shaped rods of the two support frames.

6. The carrier framework according to claim 2, wherein a length of each of the rivets is greater than an inner diameter of a respective one of the grooves.

7. A carrier framework, comprising:
two support frames, wherein:
    the two support frames are arranged opposite to each other,
    each of the two support frames comprises:
        a first U-shaped rod, wherein the first U-shaped rod comprises a first open end and a first closed end;
        a second U-shaped rod, wherein the second U-shaped rod comprises a second open end and a second closed end, and the second open end is rotatably connected to the first closed end; and
        connecting rods, wherein each of the connecting rods has an end rotatably connected to the second closed end, and limiting members are slidably connected to two ends of one of the first U-shaped rods of the two support frames, respectively, a second opening is formed on each of the limiting members, an elastic member is fixedly connected in the second opening, and the elastic member is in interference fit with the one of the first U-shaped rods of the two support frames;

a first connecting assembly, wherein two ends of the first connecting assembly are connected to first ends of the two support frames respectively; and a second connecting assembly, wherein two ends of the second connecting assembly are connected to second ends of the two support frames respectively.

* * * * *